(12) United States Patent
Alhourani

(10) Patent No.: US 11,077,891 B2
(45) Date of Patent: Aug. 3, 2021

(54) RAKAN ALHOURANI TRUCK SIDE-WIND DEFLECTOR

(71) Applicant: Rakan Elias Jamil Alhourani, Azusa, CA (US)

(72) Inventor: Rakan Elias Jamil Alhourani, Azusa, CA (US)

( * ) Notice: Subject to any disclaimer, the term of this patent is extended or adjusted under 35 U.S.C. 154(b) by 68 days.

(21) Appl. No.: 16/714,574

(22) Filed: Dec. 13, 2019

(65) Prior Publication Data

US 2021/0179205 A1    Jun. 17, 2021

(51) Int. Cl.
*B62D 35/00* (2006.01)

(52) U.S. Cl.
CPC .................. *B62D 35/001* (2013.01)

(58) Field of Classification Search
CPC ............................. B62D 35/00; B62D 35/001
See application file for complete search history.

(56) References Cited

U.S. PATENT DOCUMENTS

| | | | |
|---|---|---|---|
| 7,357,442 B1 * | 4/2008 | Drews .................... | B62D 35/00 296/180.1 |
| 9,278,720 B2 * | 3/2016 | Rao ........................ | B62D 35/001 |
| 9,340,240 B2 * | 5/2016 | Clark ..................... | B62D 35/001 |
| 9,718,506 B1 * | 8/2017 | Yeik ....................... | B60K 16/00 |
| 2013/0076064 A1 * | 3/2013 | Smith .................... | B62D 35/001 296/180.1 |
| 2020/0023911 A1 * | 1/2020 | Otterstrom .............. | B62D 35/02 |

* cited by examiner

*Primary Examiner* — Lori L Lyjak

(57) ABSTRACT

The present invention is a device that deflects or changes the direction of vehicle's vertical side wind, hence reducing the generated force, which prevents vehicle's flipping over caused by this side wind. This device consists of three parts: a deflector part comprising multiple deflector blades and deflector axis shaft. And a hook part comprising a hook piece, a hook blade piece, and a hook axis shaft. And a spring part. the deflector device has a primary position and a secondary position; in primary position the deflector part's plane is parallel to vehicle's side surface plane and hook piece is locking deflector part and spring part is squeezed; in secondary position high wind velocity rotates hook part away from deflector part, hence freeing the spring so it extends and pushes the deflector part away from vehicle's side surface, hence increases space between them, hence facilitates air flow and wind deflection.

3 Claims, 11 Drawing Sheets

RAKAN ALHOURANI TRUCK SIDE-WIND DEFLECTOR

CROSS-REFERENCES TO RELATED APPLICATIONS

Not Applicable

STATEMENT REGARDING FEDERALLY SPONSORED RESEARCH OR DEVELOPMENT

Not Applicable

STATEMENT REGARDING PRIOR DISCLOSURES BY THE INVENTOR OR A JOINT INVENTOR

Not Applicable

FIELD OF THE INVENTION

The present invention generally relates to a device that is used to deflect or to change the direction of vehicle body vertical wind. By using this device, the vertical side wind will be deflected, hence reducing the side force that may cause truck or vehicle flipping over.

BACKGROUND OF THE INVENTION

Rakan Alhourani Truck Side-Wind Deflector has an application in many vehicles, that may flip over due to the force built up by vertical side wind.

SUMMARY OF THE INVENTION

This present invention is a device that deflects vehicle vertical side-wind. This device consists of: wind deflector part that rotates around an axis, hooks part that are attached to a hook-blade each, and springs part. The deflector part deflects wind from a vertical direction facing the vehicle body to a horizontal direction moving among the vehicle body surface. At a primary position the deflector part laying parallel to the body surface of the vehicle, the springs are squeezed, and the hooks are locking the deflector part. At a secondary position, the deflector part upper side is pushed away from the body surface of the vehicle, the springs are freed, and the hooks are detached from the deflector part.

DETAILED DESCRIPTION OF THE INVENTION

Figure 1:
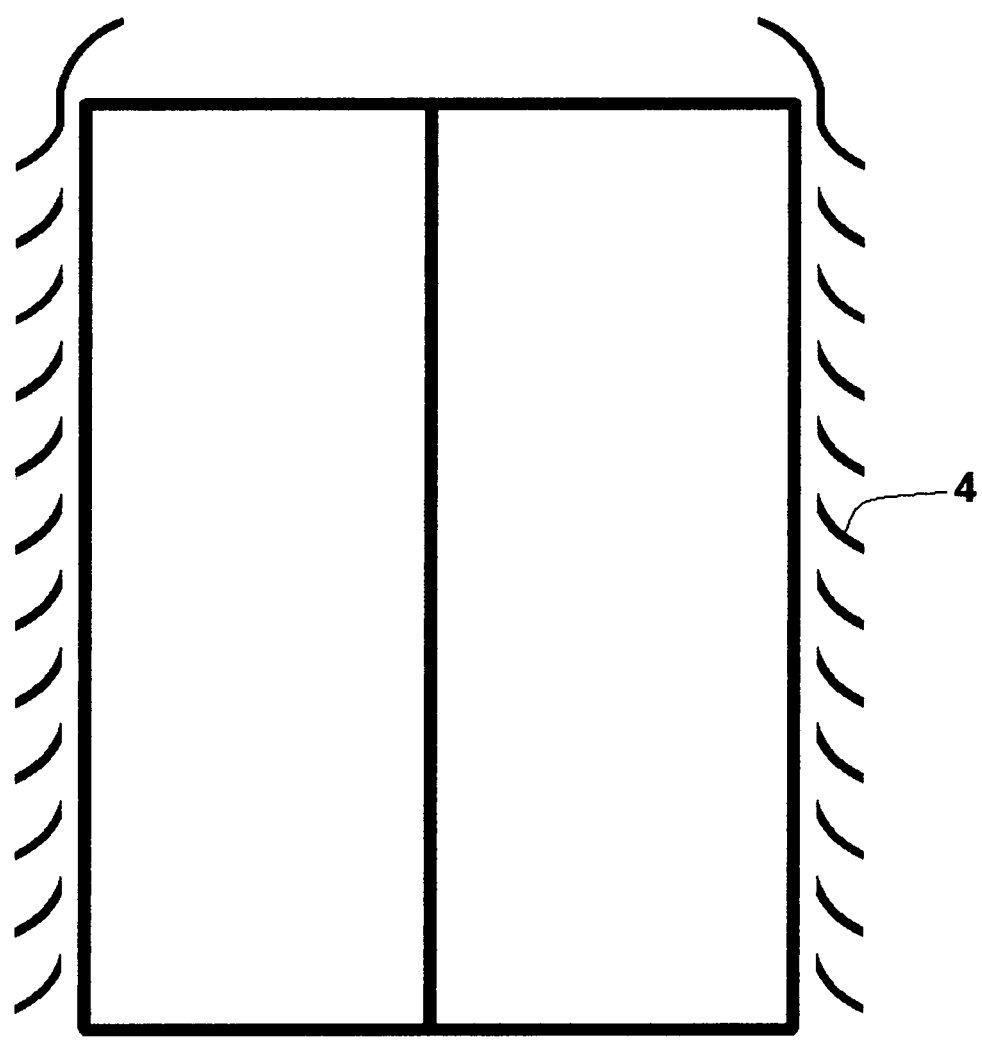
FIG. 1: A view of Rakan Alhourani Truck Side-Wind Deflector on both sides of a vehicle at a primary position.
Figure 2:
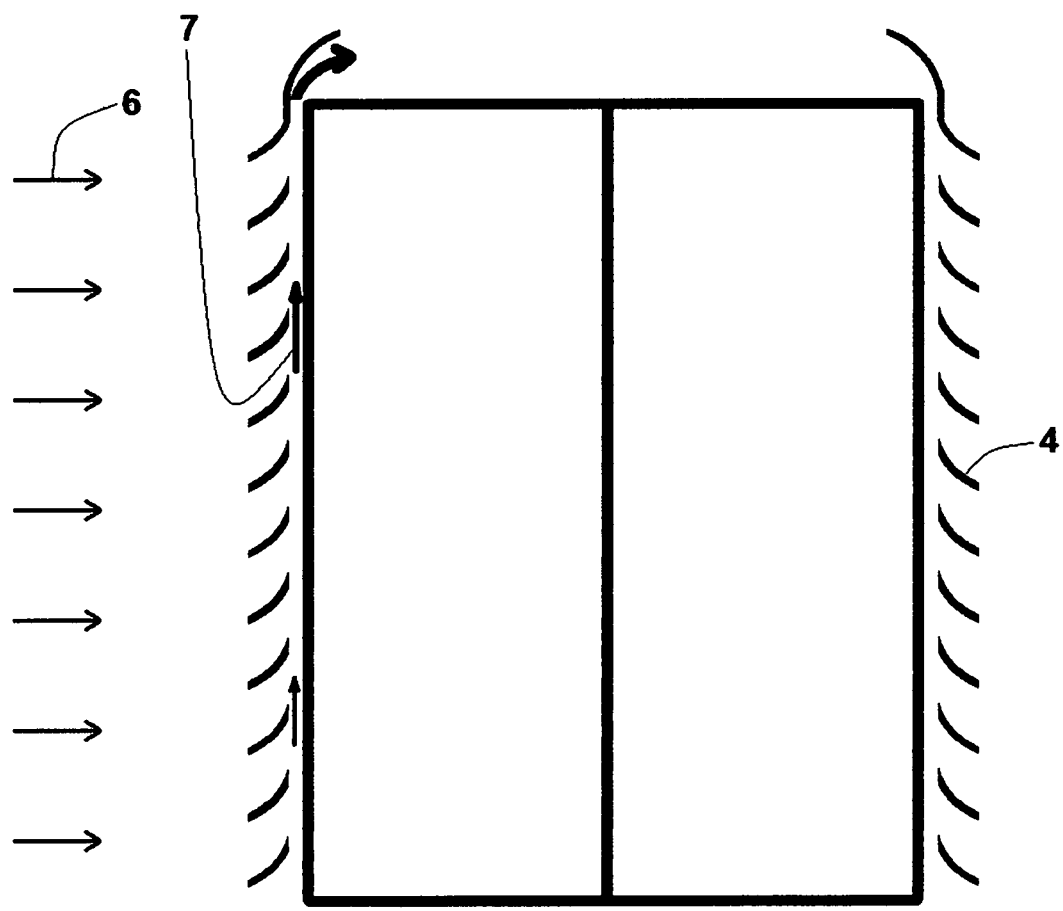
FIG. 2: A view of Rakan Alhourani Truck Side-Wind Deflector on both sides of a vehicle at a primary position with arrows illustrating wind direction.
Figure 3:
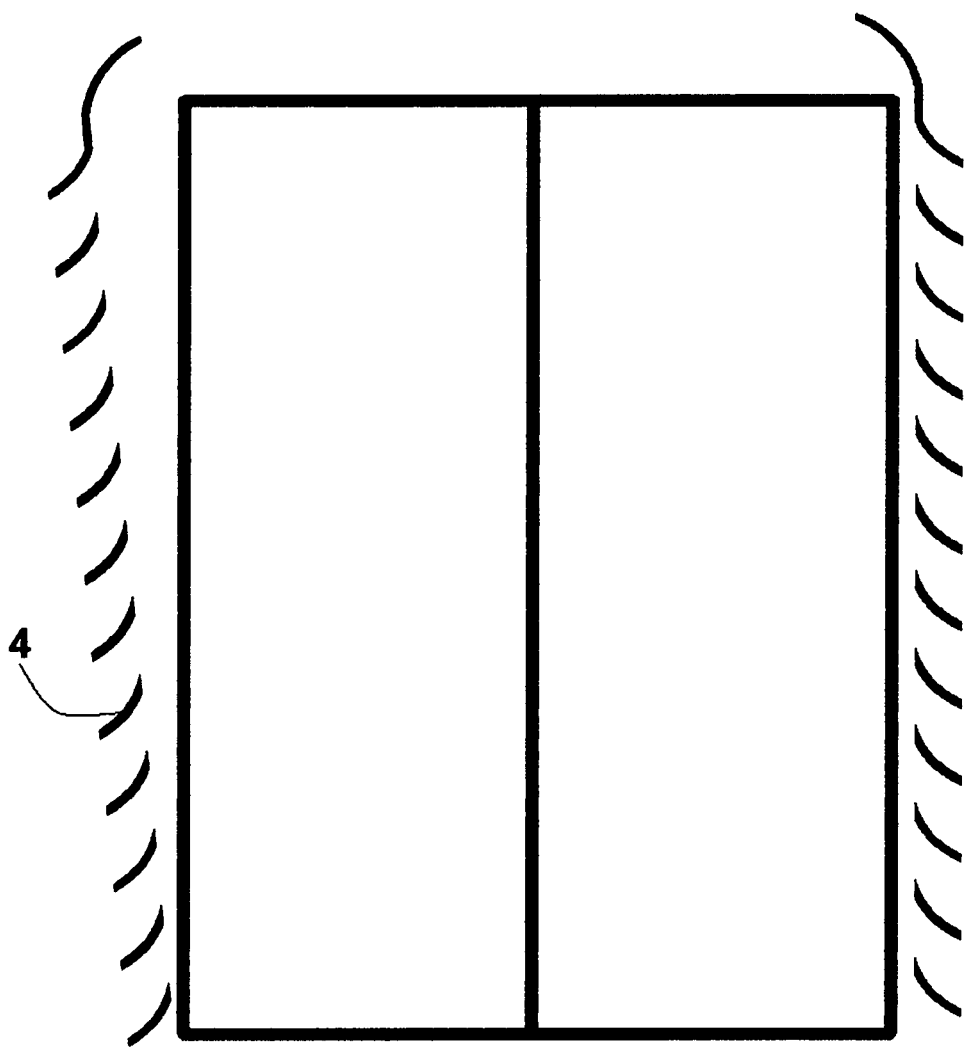
FIG. 3: A view of Rakan Alhourani Truck Side-Wind Deflector on both sides of a vehicle with the left deflector is at secondary position.
Figure 4:
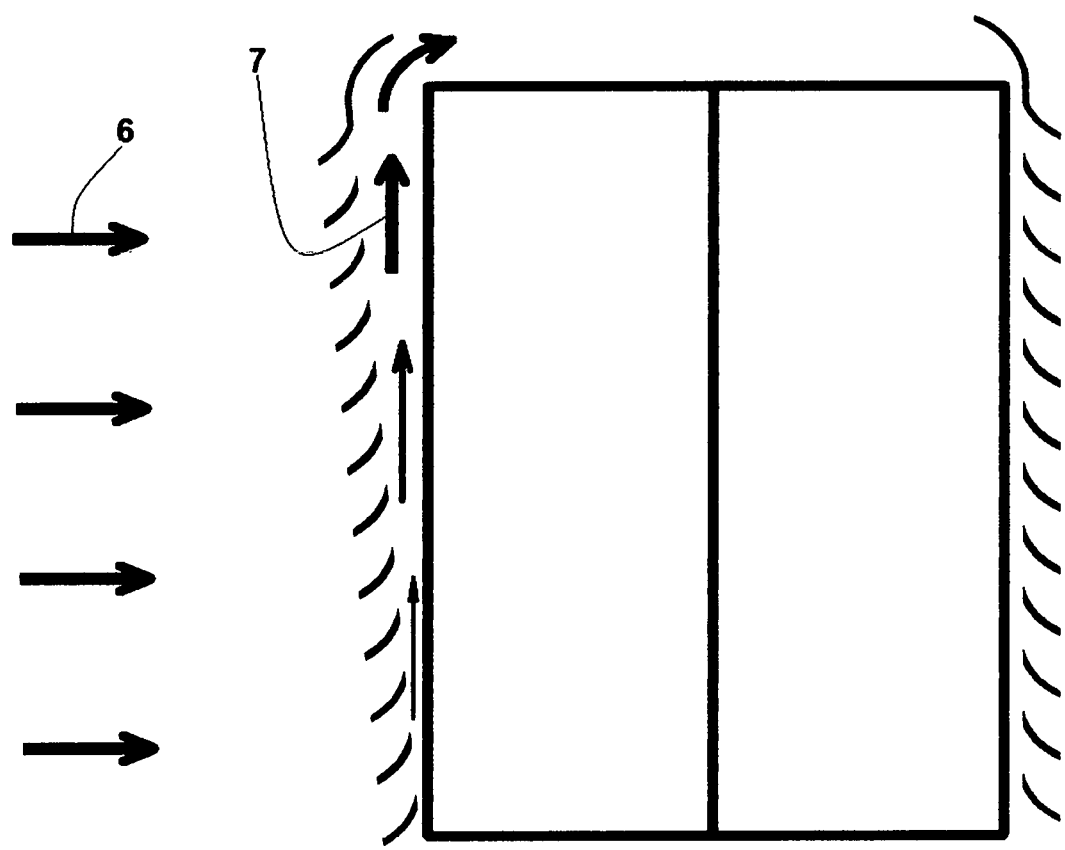
FIG. 4: A view of Rakan Alhourani Truck Side-Wind Deflector on both sides of a vehicle (the left deflector is at secondary position) with arrows illustrating wind direction.
Figure 5:
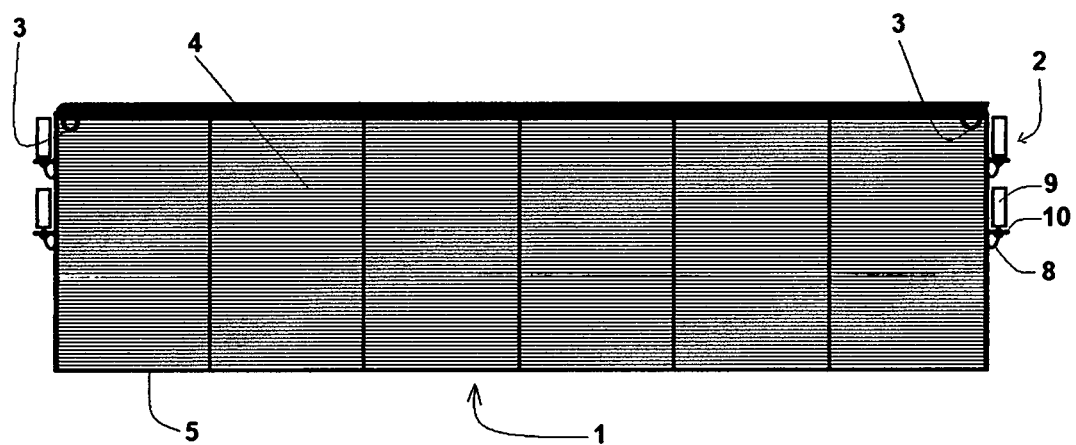
FIG. 5: General view of Rakan Alhourani Truck Side-Wind Deflector.
Figure 6:
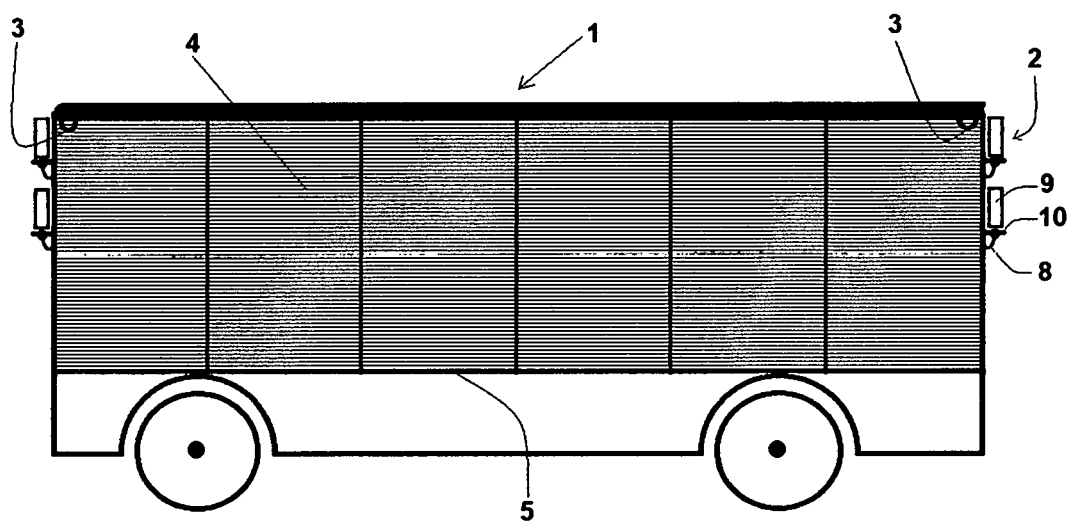
FIG. 6: General view of Rakan Alhourani Truck Side-Wind Deflector applied on a vehicle.
Figure 7:
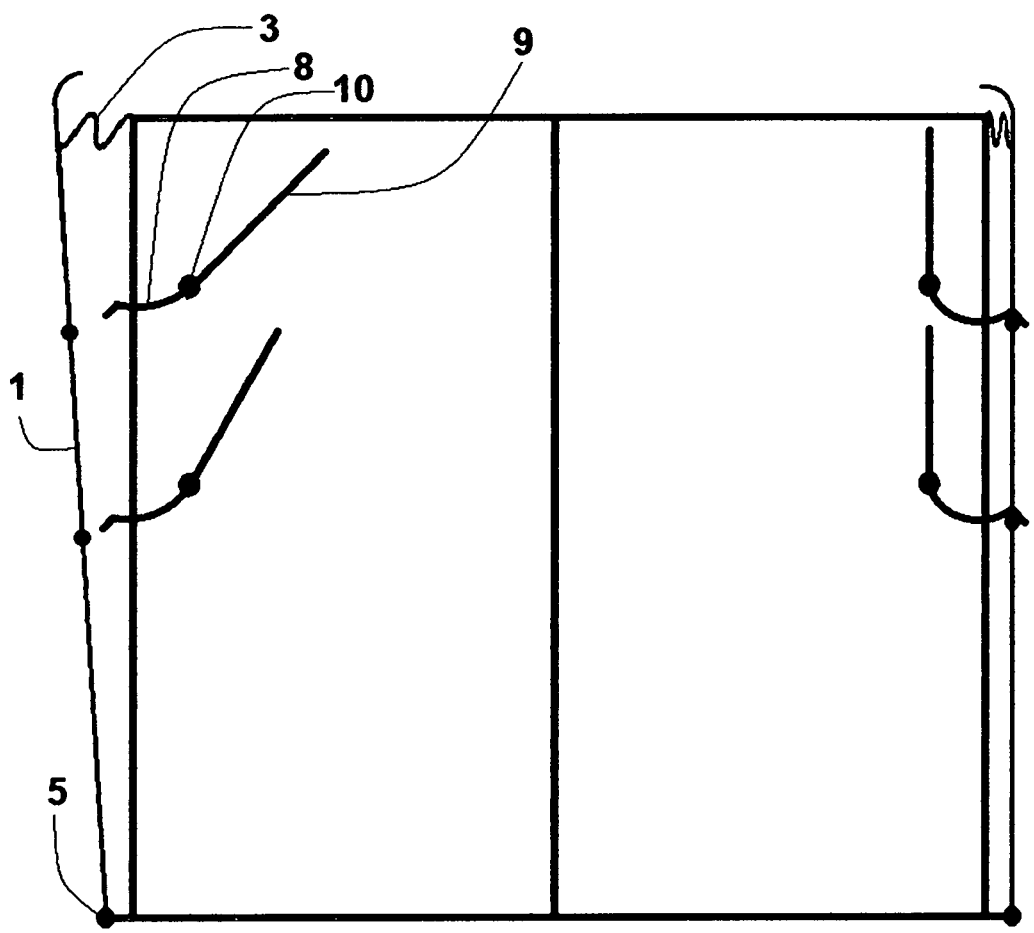
FIG. 7: An illustrating drawing showing primary position (Right side) and secondary position (Left side) of Rakan Alhourani Truck Side-Wind Deflector.
Figure 8:
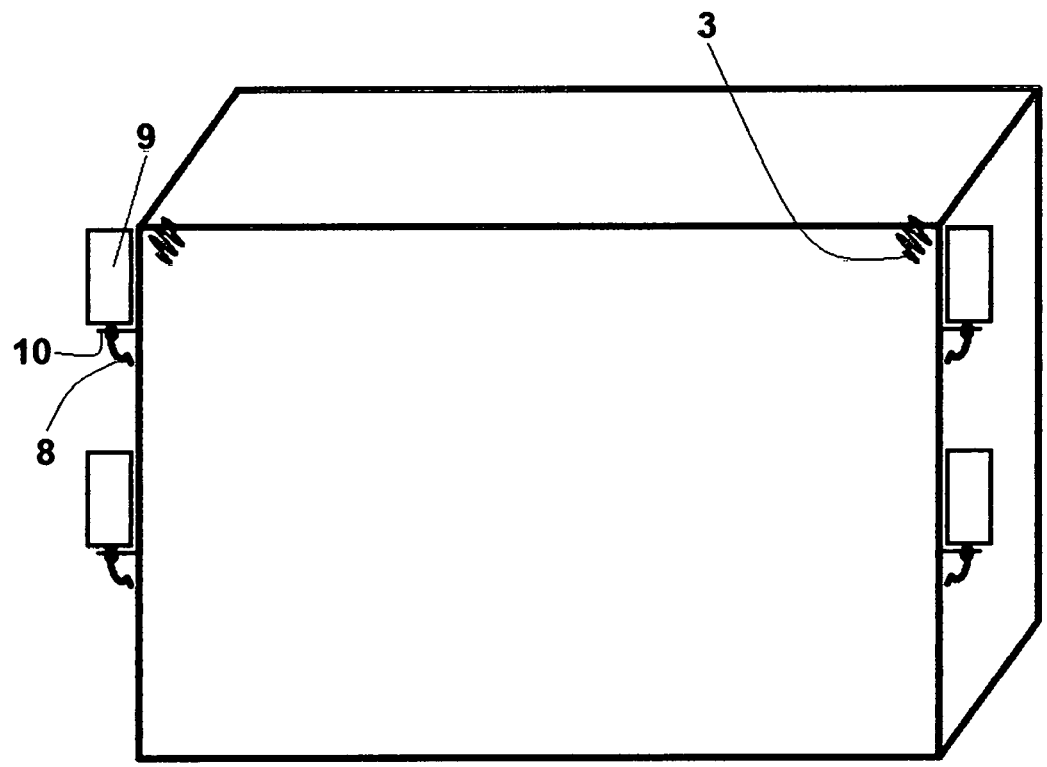
FIG. 8: An illustrating drawing with a side view, showing the hooks part and the springs part with the deflector part removed.
Figure 9:
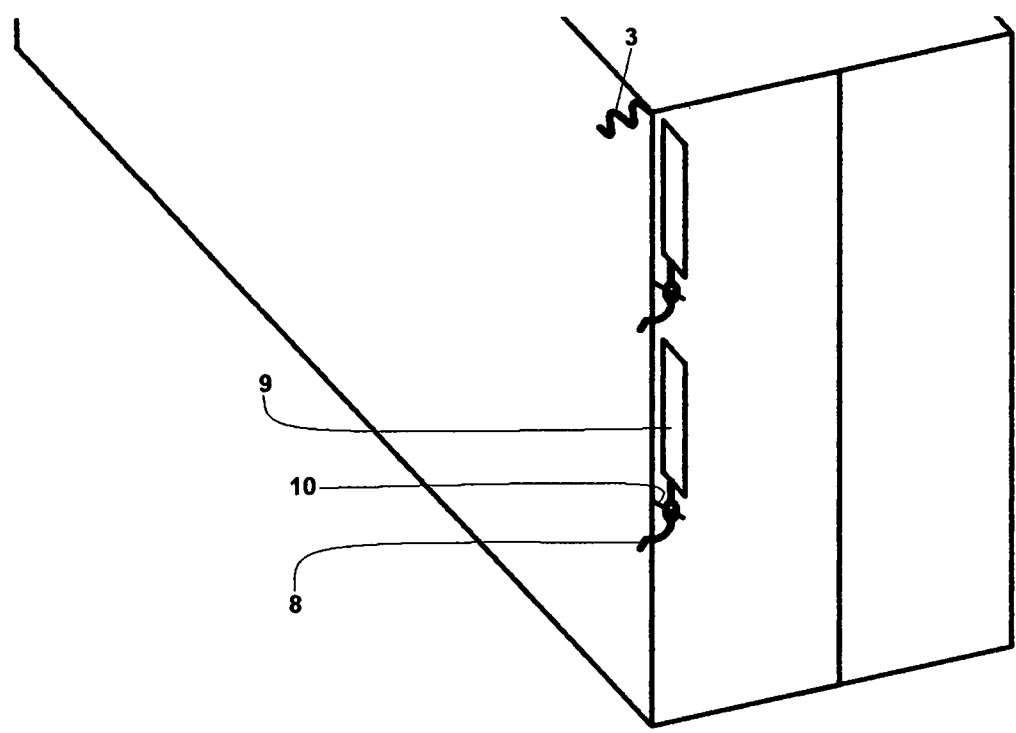
FIG. 9: An illustrating drawing with a side-up-back view, showing the hooks part and the spring part with the deflector part removed.
Figure 10:
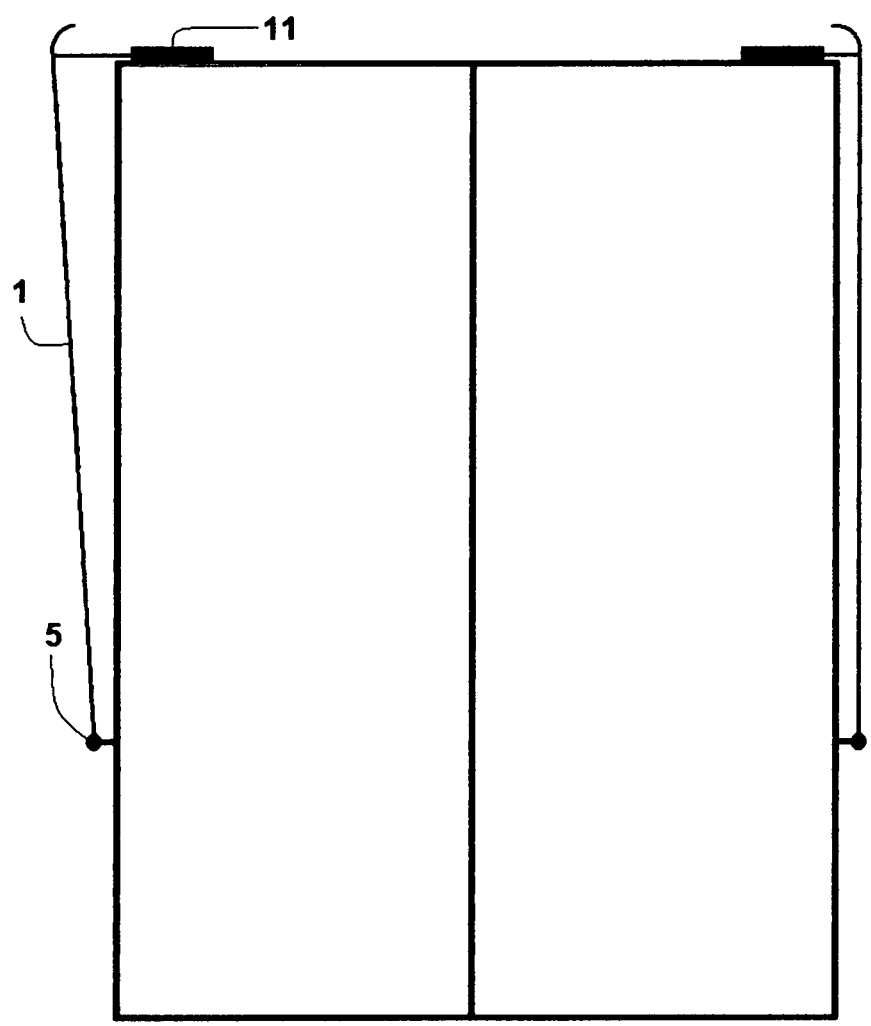
FIG. 10: An illustrating drawing showing primary position (Right side) and secondary position (Left side) of Rakan Alhourani Truck Side-Wind Deflector with the deflector part covering part of the body of the vehicle and with using another mean to push and pull the deflector part.
Figure 11:
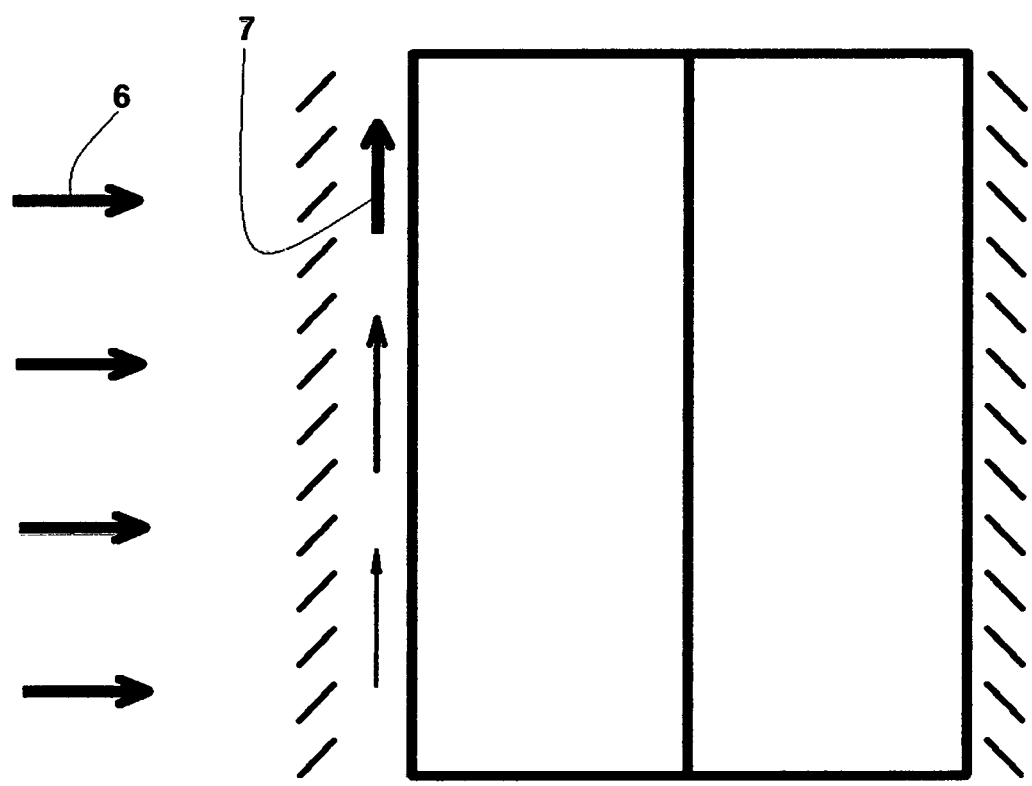
FIG. 11: An illustrating drawing showing primary position (Right side) and secondary position (Left side) of Rakan Alhourani Truck Side-Wind Deflector with all sides of the deflector part are pushed away and with using straight deflector blades.
Figure 12:
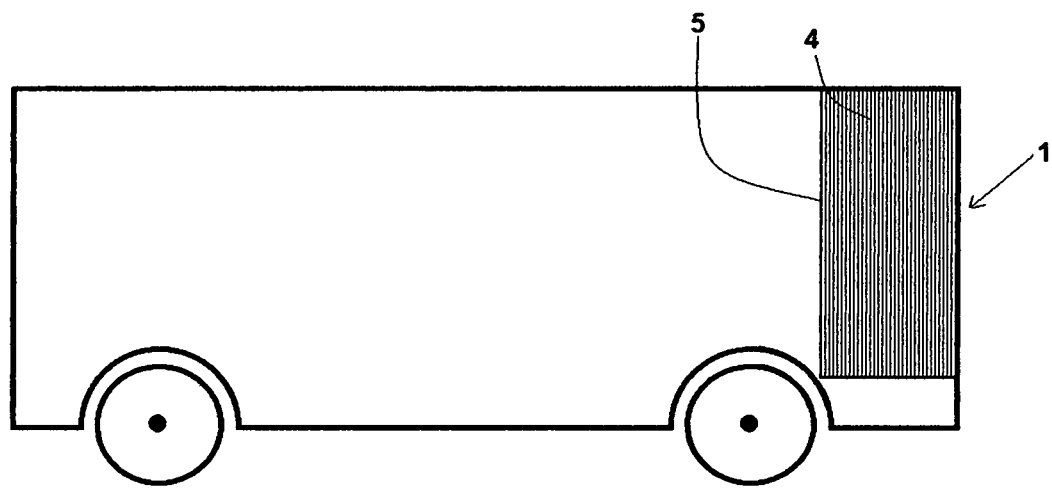
FIG. 12: A drawing showing Rakan Alhourani Truck Side-Wind Deflector covering an area of vehicle body with deflector blades oriented from up to down.

Rakan Alhourani Truck Side-Wind Deflector FIG. 5 consists of three parts: a deflector part 1, hooks part 2, and springs part 3. First part is deflector part 1 consists of deflector blades 4 and a deflector axis 5; Deflectors in FIG. 1, FIG. 2 FIG. 3 and FIG. 4 have curved blades 4 and they could be flat-shaped too FIG. 11, and they function to deflect or redirect the vertical component of the side-wind 6, from vertical direction 6 to horizontal direction 7, moving among the vehicle body surface plane, hence reducing the vertical force on the surface that is generated by the vertical wind, hence reducing the possibility of the vehicle flipping over. At primary position FIG. 1 and FIG. 2, the wind will flow at the space between the deflector and the vehicle body surface, which is very small space comparing to the area of the deflector surface, this will lead to a huge increase in wind velocity at that space, so at some point we need to increase the space between the deflector and the vehicle body surface as shown in FIG. 3 and FIG. 4, the deflector blades 4 rotates around the deflector axis shaft 5 at the lower edge of the deflector and this illustrates the secondary position of the deflector. Second part is hooks part, each hook consists of a hook piece 8 and a hook blade piece 9, that rotate around a hook axis shaft 10. At a primary position the hook piece is locking the deflector, and at a secondary position when wind exceeds a certain velocity the hook blade piece 9 will rotate around the hook axis shaft 10, moving the hook piece 8 away from the deflector 1. Third part is springs part 3; one or more springs could be used. At primary position, springs are squeezed and at secondary position, springs are freed. FIG. 6 shows Rakan Alhourani Truck Side-Wind Deflector applied on a vehicle side surface at primary position, noticing that the device does not have to cover the whole side surface. FIG. 7 shows the left side deflector at secondary position, noticing that the springs are freed and the hook piece of the hook part is rotated away from the deflector, hence the deflector upper edge is pushed away form the vehicle side surface, while the right side deflector is at primary position. FIG. 8 and FIG. 9 illustrate side views showing the hooks part and the springs part with the deflector part removed. At the primary position, the deflector part 3 plane is parallel to the vehicle body surface and the hook piece 8 is connecting and locking the deflector in its primary position so the springs 3 cannot push it away; at this position, wind with lower velocity is directed ninety degrees from vertical on the surface of the deflector and the vehicle body surface to horizontal (parallel) in relation to them, hence reducing the direct vertical force on the body surface; when the wind reaches a higher velocity, it will push the hook blade piece 9 hence rotating the hook part 2 around the hook axis shaft 10, resulting in moving the hook piece 8 away from the deflector, which will free the springs part 3, that will rotate the deflector part 1 around the deflector axis shaft 5, which will push the deflector blades 4 away from the vehicle body surface allowing more bulk of wind air to travel between the deflector and the side surface, hence easing the deflection of high velocity wind, so reducing the force causing vehicle flipping over. Switching from secondary position to primary position could be done manually or automatically, as shown in FIG. 10 using other means 11 to push deflector part away and to pull it back. Switching between primary and secondary positions could be done using many other designs and mechanisms, but the main idea is that when the vehicle body surface faces high speed wind, the deflector is pushed away from the body surface in order to get more volume to facilitate air deflection, hence reducing the vertical force results from the wind. And as shown in FIG. 11 deflector part can be pushed away from all sides, not only rotating around a fixed axis FIG. 3, FIG. 4, FIG. 7 and FIG. 10. Deflector part can be applied on with covering various areas percentage of various vehicle body locations FIG. 10. Moreover, deflecting wind upward generates a downward force that pushes vehicle downward, hence giving more stabilization to the vehicle and wind can be deflected towards any direction, depending on the orientation of deflector blades FIG. 12.

The invention claimed is:

1. A wind deflector device comprises three parts,
   a deflector part comprising multiple deflector blades and deflector axis shaft, said deflector blades are located above and parallel to each other, said deflector blades deflects wind passing through deflector, said deflector axis shaft is at the lower edge of the deflector part and is connected to a vehicle body surface,
   and a hook part comprising a hook piece, a hook blade piece, and a hook axis shaft, said hook blade piece is flat in shape and connected with said hook piece, and rotates around said hook axis shaft, said hook piece is attached to deflector part at one primary position and is separated at other secondary position, said hook axis shaft is connected to vehicle,
   and a spring part, said spring part is connected to the deflector part upper edge at one end and to vehicle body surface at another end, wherein the deflector device is applied to a vehicle body surface, wherein deflector device has one or more hook part and has one or more spring part, wherein the deflector device has a primary position and a secondary position, wherein in primary position the deflector part plane is parallel to vehicle body surface plane and hook piece is attached to and locking deflector part and spring part is squeezed, wherein in secondary position high wind velocity forces hook blade piece to rotate, hence moving the hook piece away from deflector part, hence freeing the spring so it extends and pushes the deflector part away from vehicle body surface, hence increase space between deflector part and vehicle body surface, hence facilitates air flow and wind deflection, wherein wind is deflected at both primary and secondary positions, wherein wind deflection at primary and secondary positions leads to reduction of force resulting from vertical wind, hence reducing possibility of vehicle flipping over.

2. The wind deflector device of claim 1 wherein the deflector part is pushed away and pulled back using other manual or automated means.

3. The wind deflector device of claim 1 wherein the deflector part is pushed away from all sides at secondary position.

\* \* \* \* \*